(12) United States Patent
Lau et al.

(10) Patent No.: US 11,642,634 B2
(45) Date of Patent: May 9, 2023

(54) GAS SATURATION OF LIQUIDS WITH APPLICATION TO DISSOLVED GAS FLOTATION AND SUPPLYING DISSOLVED GASES TO DOWNSTREAM PROCESSES AND WATER TREATMENT

(71) Applicants: Ronald A. Lau, North Aurora, IL (US); Karen L. Ringel, Wheaton, IL (US)

(72) Inventors: Ronald A. Lau, North Aurora, IL (US); Karen L. Ringel, Wheaton, IL (US)

(73) Assignee: Fuel Tech, Inc., Warrenville, IL (US)

( * ) Notice: Subject to any disclaimer, the term of this patent is extended or adjusted under 35 U.S.C. 154(b) by 0 days.

(21) Appl. No.: 17/169,487

(22) Filed: Feb. 7, 2021

(65) Prior Publication Data
US 2021/0283557 A1 Sep. 16, 2021

Related U.S. Application Data

(63) Continuation-in-part of application No. 62/988,049, filed on Mar. 11, 2020.

(51) Int. Cl.
*B01F 23/21* (2022.01)
*B01F 23/234* (2022.01)
(Continued)

(52) U.S. Cl.
CPC .... *B01F 23/23412* (2022.01); *B01F 23/2132* (2022.01); *B01F 23/2368* (2022.01);
(Continued)

(58) Field of Classification Search
CPC ..... B01F 23/21; B01F 23/213; B01F 23/2132
See application file for complete search history.

(56) References Cited

U.S. PATENT DOCUMENTS

| | | | |
|---|---|---|---|
| 4,064,047 A | 12/1977 | Bernreiter et al. | |
| 5,049,320 A | 9/1991 | Wang et al. | |
| 7,255,332 B2 * | 8/2007 | Osborn | B01F 25/31331 |
| | | | 261/115 |

(Continued)

FOREIGN PATENT DOCUMENTS

| | | | | |
|---|---|---|---|---|
| GB | 2380951 A | * | 4/2003 | B01D 24/14 |
| JP | 3874350 B2 | * | 1/2007 | |
| WO | WO 91/01809 | | 2/1991 | |

OTHER PUBLICATIONS

Al-Anzi, Performance Of A Novel Confined Plunging Jet Reactor Incorporating An Annular Air Lift Column, Loughborough University Institutional Repository, 2007.
(Continued)

*Primary Examiner* — Robert A Hopkins
(74) *Attorney, Agent, or Firm* — OspreyIP, pllc; James R. Cartiglia

(57) ABSTRACT

The description relates to methods and apparatus that enable the efficient introduction of gases like air, oxygen and ozone into aqueous liquids. Gases are introduced into liquids for making that gas chemically or biologically available at a minimum energy expenditure. Impinging jets of liquid are directed into a pressurized saturation vessel having a gas-filled headspace and a saturation zone below the surface of the liquid at a velocity sufficient to create a turbulent impact and plunge zone. The resulting turbulence and mixing of gas and liquid in that zone under pressure, causes the gas to be driven into the liquid in the vessel and breaks up the gas and the liquid into a churning flow and creates a large number of bubbles. The resulting gas-enriched liquid is discharged from the vessel at an outlet to ensure a minimum of bubbles in the gas-enriched liquid.

23 Claims, 6 Drawing Sheets

(51) Int. Cl.
    *B01F 23/23*    (2022.01)
    *B01F 23/213*    (2022.01)
    *C02F 1/74*    (2023.01)
    *C02F 1/78*    (2023.01)
    *B01F 23/237*    (2022.01)

(52) U.S. Cl.
    CPC ............... *B01F 23/2376* (2022.01); *B01F 23/237611* (2022.01); *B01F 23/237612* (2022.01); *B01F 23/237613* (2022.01); *C02F 1/74* (2013.01); *C02F 1/78* (2013.01)

(56) References Cited

U.S. PATENT DOCUMENTS

| | | |
|---|---|---|
| 7,261,283 B1 | 8/2007 | Ohnari |
| 7,704,389 B2 | 4/2010 | Koons |
| 8,500,104 B2 | 8/2013 | Spears et al. |
| 8,668,187 B2 | 3/2014 | Al-Anzi |
| 9,308,505 B2 | 4/2016 | Spears et al. |
| 9,315,402 B2 | 4/2016 | Osborn et al. |
| 10,712,248 B2 * | 7/2020 | Al-Anzi ............ B01F 23/23231 |
| 2009/0184060 A1 | 7/2009 | Mast |

OTHER PUBLICATIONS

Bin, Gas Entrainment By Plunging Liquid Jets, Chem. Eng. Sci., vol. 48, No. 21, pp. 3585-3630, 1993.

Tasdemir et al., Gas Entrainment Rate and Flow Characterization In Downcomer Of A Jameson Cell, Physicochem. Probl. Miner. Process., 47(2011) 61-78.

\* cited by examiner

GAS SATURATION OF LIQUIDS WITH APPLICATION TO DISSOLVED GAS FLOTATION AND SUPPLYING DISSOLVED GASES TO DOWNSTREAM PROCESSES AND WATER TREATMENT

CROSS REFERENCE TO RELATED APPLICATIONS

This application is a regular filing claiming priority to U.S. Provisional Patent Application Ser. 62/988,049, filed Mar. 11, 2020, by inventors Ronald A. Lau, et al., the disclosure of which is incorporated herein in its entirety.

FIELD OF THE INVENTION

The invention addresses significant problems with the prior art in efficiently dissolving gases in liquids while simultaneously controlling undissolved gas content in an exit stream, with applications for water treatment or other downstream processes typically fed by a gas saturator device.

The invention is specific to gas saturation of liquids in a single-pass, continuously flowing process and device feeding gas-laden liquid to an end-use in which the gas-laden liquid feed is pressurized and undissolved gas content is both minimized and controlled.

In all embodiments the goal is to minimize energy use while maximizing the dissolved content of gas in the processed liquid while also simultaneously limiting undissolved gas content exiting the device in either size of escaping bubbles or total undissolved gas volume.

Applications for this invention include as a feed stream for processes that introduce into water a depressurized feed stream in a manner that minimizes bubble formation for making that gas chemically or biologically available. In other applications the invention provides a feed stream for processes that depressurize the feed stream to maximize bubbles of predetermined sizes for use in dissolved air flotation wherein the gas is used to physically separate or treat a receiving body of contaminant-laden liquid. Other applications needing an efficient, pressurized gas-laden liquid stream provided by the invention exist or may be contemplated.

BACKGROUND OF THE INVENTION

Clean water is vital to our health, communities, economy and the environment. The effective treatment of water often requires the dissolution of gases like air, oxygen and ozone into drinking, agricultural, lake or waste water. As a means towards that end, in some cases, a gas-laden liquid is used in water treatment to aid in the production of bubbles to effect a physical separation of suspended solids from contaminated water. In other cases, gas-laden liquid is used as a carrier to provide a dissolved gas for chemical or biological treatment ends, such as for odor management or the breakdown of contaminants by oxygen-consuming bacteria.

Devices and processes in which a gas is dissolved into a liquid are common and varied, but generally serve one of two clearly distinct purposes. The first dissolves a gas into liquid in order to facilitate a chemical reaction among the components within the dissolving system. The gas is at least partially consumed and is not a sought after product of the procedure. In the second, the objective is creating a gas-laden liquid (not utilizing the gas to chemically alter the liquid or other component) to feed a separate, downstream process. The former is a reactor used to create a new product in situ, while the latter is a saturator used to create the gas-laden liquid as the end product itself.

For example, aeration is a common process for increasing the dissolved oxygen content of water. Many aeration technologies bubble air or oxygen gas through diffuser plates or tubes to create bubbles directly in the receiving water. The efficiency of the gas transfer from the bubbles to the water depends on many factors including bubble size, water depth, temperature and so forth. The equipment for feeding the bubbles is submerged and fixed in location. Inefficiency in gas transfer occurs when bubbles rise and escape the surface before imparting their gas to the liquid, and is generally exacerbated when the submerged equipment deteriorates and affects feed flow and bubble size control. The use of a saturator device to dissolve oxygen in water subsequently fed to the reservoir to be treated is not common but known, and an improvement to the efficiency and control of the saturation process and device would make the application more acceptable.

In another example, dissolved gas flotation is a common process seeking to use the buoyancy of bubbles to separate suspended solids from a contaminated liquid stream. The bubbles are generally created by depressurizing gas-laden liquid through artful means downstream of a saturation device. Though bubbles are needed for the end use of dissolved gas flotation, the gas-laden liquid feeding the process is desired to have minimal undissolved gas content so that bubble size can be entirely controlled in the end process.

Although the end process is very different for aeration and dissolved gas flotation, both applications would benefit from an efficient single-pass, continuously flowing process and device that delivers gas-laden liquid in which undissolved gas content is both minimized and controlled.

Saturators are a subset of gas-liquid contactors that have widespread use in providing dissolved gases. In general, they are used to transport gas content in a liquid (the exiting saturator fluid) to a receiving process to advance a chemical, biological or physical end use. For example, dissolving oxygen in a saturator liquid for transport to a receiving water to increase the receiving water's dissolved oxygen content is a practiced application in water treatment. Dissolving air in a saturator liquid for transport to a receiving water for the purpose of subsequent controlled creation of bubbles in the receiving water is a practiced application for separating solids from the receiving water by dissolved air flotation or froth flotation. Dissolving ozone is practiced for disinfection applications, and dissolving carbon dioxide is practiced for decreasing the pH of alkaline waters. Saturators are continuous, non-recirculating (single-pass), pressurized vessels meant to produce a gas-laden liquid efficiently, which means delivering a product with minimal undissolved gas content.

With respect to saturators used to continuously dissolve a gas in a liquid for downstream processes, they can generally be segregated into two basic categories: packed and unpacked vessel systems. Unpacked systems use a vessel partially filled with water over which fine droplets are sprayed into a gaseous headspace to promote gas-liquid contact. Packed systems use a vessel partially or mostly filled with a packing material such as balls or rings over which water is sprayed and allowed to trickle through to create a thin film of liquid on the packing material to promote contact with the surrounding gas.

In contrast, plunging jet gas-liquid contactors introduce gas into a liquid by directing a jet of liquid into the liquid below a headspace, to form gas-liquid turbulence that drives the gas into close contact with the liquid and promote dissolution of the gas into the liquid. This free-form turbulence is a great advantage over unpacked spray-based saturators, which rely on gas-liquid contact in the gaseous headspace. The plunging jet-based contactors primarily rely on gas-liquid contact in the liquid below a usually much shorter headspace. Pressurized plunging jet contactors are common practice as reactors, but are notably absent in practice as saturators.

Both spray systems and plunging jet systems have certain drawbacks. With respect to spray systems, the nozzles used to make fine sprays require a significant pressure drop across the nozzle to achieve mechanical atomization. This pressure drop results in an increased demand for electricity when compared against the lower pressure drop across an optimized nozzle for a plunging jet. As a result, spray systems are likely to have a higher specific power use (i.e., the power required per mass flow of dissolved gas content exiting the saturator for downstream use) than the specific power use of an equivalent plunging jet system.

Nevertheless, despite their apparent advantage in lower power demand, plunging jet systems are not used in pressurized saturators to dissolve gas into a liquid for downstream processes. One reason for this anomaly is that, while requiring less power usage, plunging jets have a downside that is counter to the desired end product. Plunging jets for gas transfer produce copious amounts of gas bubbles that are undesired in the exiting stream of a saturator. Such bubbles represent a serious inefficiency if allowed to exit the saturator where the desired product is dissolved gas.

The prior art for plunging jet systems has not been fully developed to demonstrate their adaptation to the goal of a pressurized, single-pass saturator that minimizes energy use while maximizing the dissolved content of gas in the processed liquid while also simultaneously limiting undissolved gas content exiting the device in either size of escaping bubbles or total undissolved gas volume. Additionally, the technology of plunging jet systems has not been developed sufficiently to fully take advantage of the lowered energy consumption required by a plunging jet system for gas transfer to produce the desired gas-laden liquid as the end product. In particular, we note that current designs do not employ vessel designs that can effectively limit the size and number of bubbles escaping the saturator while producing a liquid substantially saturated with dissolved gas. In addition, current designs do not employ controls that assure operation in a manner to optimize the power to outperform existing spray-type saturator solutions.

For comparison, in a representative pressurized plunging jet reactor as described in U.S. Pat. No. 8,101,798, the system is designed for continuous recirculation of gas and liquid between a pressurized vessel and associated equipment. It is not a single pass system as would be required for an energy-efficient saturator. Typically, in reactors of this type, the liquid in the reactor recirculates from the bottom of the vessel to be reintroduced as the plunging jet. Excess gas leaving the reactor in bubble form is either vented or captured and reintroduced as well. The desired end product is neither the recirculating liquid nor the gas, but something else of value produced in situ and extracted as the reactor loop recirculates.

There is a need for a dissolved gas saturator of the plunging jet type for improved energy efficiency that continuously dissolves a gas in a liquid at elevated pressure in a separate once-through vessel for downstream process use, resulting in a liquid nearly saturated with the dissolving gas at pressure (per Henry's Law) with controlled or minimized undissolved gas content.

The art is in need of effective, economical methods to produce a liquid nearly saturated with the dissolving gas at pressure, per Henry's Law, with controlled or minimized undissolved gas content. To do so requires a system and process that employs a vessel design that limits the undissolved gas content that can exit the system via restricting the bubble size physically capable of escaping and by producing a gas-laden exit stream near but below the saturation limit for the gas in the liquid at the operating pressure. Additionally, the process and device are designed and operated to optimize power use to outperform existing spray-type saturator solutions.

SUMMARY OF THE INVENTION

The present invention enables the efficient production of a pressurized liquid substantially saturated with a dissolved gas while simultaneously controlling undissolved gas content in the exit stream of a single-pass process and device, as defined in this description and the accompanying claims.

According to an embodiment of the method of the invention, means are provided for introducing one or more cylindrical or similarly shaped impinging jets of liquid into a vertically-oriented, pressurized saturation vessel having a gas-filled headspace, a multi-phase saturation zone of gas and liquid, a zone of substantially downward flow beyond the saturation zone, and a gas-enriched liquid outlet. An impinging jet of liquid is injected vertically downward through the headspace into the saturation zone, penetrating the surface of the liquid at a velocity sufficient to create a turbulent impact and plunge zone. The resulting turbulence and mixing of gas and liquid in that zone under pressure, causes the gas to be driven into the liquid in the vessel and breaks up the gas and the liquid into a churning flow and creates a large number of bubbles promoting gas-liquid contact surface area. The saturation zone ends abruptly where the dissipating momentum of the plunging jet is offset by the rise velocity of the bubbles in the flow. As the throughput of the vessel continues downward, a zone of downward flow with substantially fewer bubbles than the saturation zone persists. The vessel geometry is optimized to both promote the gas-liquid contact in the saturation zone and the control of exiting bubble size in the exiting downward flow zone. The resulting gas-enriched liquid is discharged from the vessel at an outlet located at a distance beyond the saturation zone to further control and mitigate the ability of undissolved gases to be included in the effluent of gas-enriched liquid.

Other preferred aspects, including preferred conditions and equipment and their advantages, are set out in the description which follows.

BRIEF DESCRIPTION OF THE DRAWINGS

The invention will be better understood and its advantages will become more apparent when the following detailed description is read in conjunction with the accompanying drawings, in which.

DETAILED DESCRIPTION OF THE INVENTION

Figure 1:
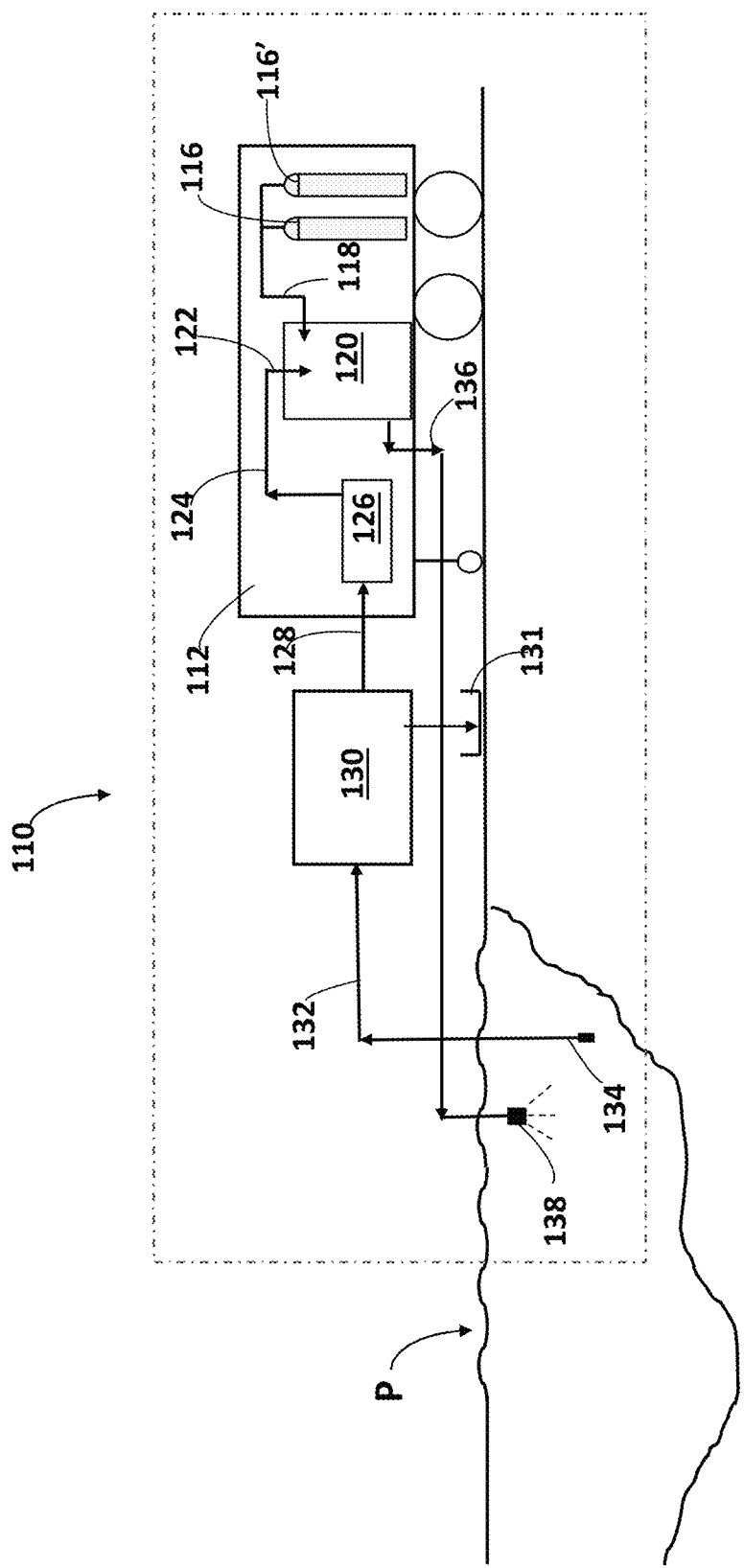
FIG. 1 schematically illustrates an arrangement of processing equipment according to the invention for producing a gas-laden liquid with a minimum of bubbles to feed a downstream process for aeration of a pond.

The invention addresses the significant problems with the prior art in efficiently dissolving gases in liquids while simultaneously controlling undissolved gas content in the exit stream, with applications for water treatment or other downstream processes typically fed by a gas saturator device. The invention is specific to gas saturation of liquids in a single-pass, continuously flowing process and device feeding gas-laden liquid to an end-use in which the gas-laden liquid feed is pressurized and undissolved gas content is desired to be both minimized and controlled.

The invention provides devices and processes that dissolve gas into a liquid, typically an aqueous liquid. Applications for this invention include the production of a pressurized feed stream for processes that introduce into water a subsequently depressurized feed stream in a manner that minimizes bubble formation for making that gas chemically or biologically available in still dissolved form, such as for aeration of bodies of water such as lakes, ponds and settling basins. In other applications the invention provides the same or similar pressurized feed stream for processes that subsequently depressurize the feed stream in a manner to maximize bubbles of predetermined sizes for use in dissolved air flotation wherein the buoyancy of the gas in bubble form is used to physically separate or treat a receiving body of contaminant-laden liquid.

Other applications needing an efficient, pressurized gas-laden liquid stream provided by the invention exist or may be contemplated. An essential feature of each system is the production of gas-laden liquid to serve a particular end use. This is achieved by taking a slip stream of liquid from a source location, pretreating the liquid as needed and pressurizing the liquid in a pressure vessel to increase the amount of gas that can be dissolved therein. In the present invention the liquid is injected as a jet and directed at the surface of the liquid held in the pressure vessel which is pressurized with the gas to be solubilized in the liquid. In the embodiments described, the liquid is aqueous and the gas is either oxygen or air, but any combination of liquid and gas can be employed. The process is generally termed plunging jet saturation, and with this invention energy use is minimized and undissolved gas in the effluent is controlled in both bubble size and total volume.

In this description, certain technical terms will be used in the discussion of noted processing effects and their evaluation. Unless specifically indicated as critical, the various numeric ranges are exemplary and include all of the values between the limits. To facilitate an understanding we provide the following

Definitions

Infusion Efficiency—There is a theoretical maximum amount of oxygen at equilibrium (specifically, or any given gas generally) that can be dissolved in water at the vessel's operating pressure (for said water's temperature and salinity) according to Henry's Law. Infusion Efficiency is the ratio of the actual oxygen dissolved to this theoretical maximum. It is technically possible to temporarily exceed this maximum "saturation" in unsteady conditions.

The amount of gas dissolved in a liquid is expressed as a concentration, such as milligrams of oxygen per liter of water. The amount of gas that can dissolve in a liquid at equilibrium conditions is described by Henry's Law. Other conditions being equal (such as temperature, salinity, or other water conditions), Henry's Law states that the amount of dissolved gas in a liquid at equilibrium is proportional to its partial pressure above the liquid. To achieve high levels of dissolved gas in a liquid, pressurized vessels are often employed. In fact, the highest levels of dissolved gas in a liquid are achieved with this approach.

Under non-equilibrium conditions it is possible to achieve "supersaturation" of the gas in the liquid relative to equilibrium conditions, i.e., to achieve a gas concentration in excess of that predicted by Henry's Law. An example in nature is the slight supersaturation in seawater at an ocean surface due to bubble-driven gas exchange originated by crashing waves. The supersaturation arises because air entrained into bubbles is compressed relative to atmospheric pressure.

For evaluating alternative saturation vessel designs, we have benchmarked our oxygen transfer to the theoretical saturation limit provided by Henry's Law using tap water over a range of operating pressures, ignoring the small potential for supersaturation within the vessel and ignoring the small amount of dissolved gas that may be present in the inflow water (which should not be neglected if it is not known to be small). Infusion Efficiency for the purposes of this description and as shown in our performance data at a given pressure is calculated as:

$$\text{Infusion Efficiency} = \frac{\text{Measured Oxygen flow to the pressure vessel(mg/L)}}{\text{Theoretical Maximum Achievable by Henry's Law(mg/L)}}$$

The higher the Infusion Efficiency the better for plunging jet saturation infusion vessels, as for a given flow rate of water this increases the oxygen delivered to the client's end process. Note however that the oxygen flow is measured at the entrance to the pressure vessel and is "oxygen throughput," not a direct measure of dissolved oxygen, which would be more difficult to obtain as a basis for process control. Thus, a calculated Infusion Efficiency of over 100% more likely means some gas is escaping undissolved from the system. If it is significant, in practice the process operator might observe the exit injectors sputter or see bubbling at the surface of the water above where the injectors are submerged. However, in this invention we offer a better control signal, i.e., a step-change in the behavior of water flow and oxygen flow in our single-pass device that clearly delineates when the gas has ceased dissolving in the water and is instead displacing water (as bubbles) in the exit stream.

Specific Power Use—Operating the saturator vessel at elevated pressure takes energy, which is an operating cost to be minimized. Specific Power Use is the power used per mass flow rate of oxygen transferred.

Whatever oxygen delivery a saturator system is achieving, operating that system expends energy resulting in costs associated with energy production and, with respect to energy generated by the combustion of carbonaceous fuels, harm to the environment. Pumping the carrier water from its source to the vessel operating at pressure is the primary energy cost. Additionally, producing oxygen to feed the system might be included in the energy cost if it is produced on site. For the purposes of evaluating alternative vessel designs, we have only considered the power used to raise the carrier water to the pressure required. This pressure is measured upstream of the pressure vessel and includes the vessel operating pressure and the additional pressure differential across the water nozzle that creates the plunging jet.

$$\text{Specific Power Use} = \frac{\text{Horsepower to pump water to required pressure}}{\text{Oxygen flow rate(lb/hr)}}$$

The definitions herein are for clarity of this description, but it will be understood that other definitions have been adapted by others for specific applications. For example, in some wastewater aeration applications the term "aeration efficiency" is sometimes used to express the amount of oxygen transferred to the wastewater being treated for the power applied in the aeration process. It has units that are the inverse of Specific Power Use. We've chosen to express our design basis using Specific Power Use to avoid confusion with the term used as an end-use treatment performance measure. If all oxygen transferred to the process water in our process is subsequently transferred as dissolved oxygen to an aeration treatment reservoir, then the two terms are measuring the same thing. Specific Power Use only relates to the present system for saturation and is not dependent on the end-use of the gas-laden liquid produced.

Volumetric Mass Transfer Coefficient—This is a performance metric useful in contemplating design alternatives, so we will explain how it has affected our saturator vessel design basis and how it would be used to design vessels for alternative gases or other operating conditions.

In the present saturator vessel, gas is transferred into the water from the gas bubbles generated by the plunging jet and turbulent flow. Gas transfer from bubbles to the liquid volume depends on the volumetric mass transfer coefficient ($k_L a$). This coefficient is actually the product of two variables: "$k_L$" is the mass transfer coefficient between the gas and liquid and "a" is the total surface area over which that transfer occurs. The number or size distribution of bubbles in the saturator vessel is unknown to calculate the surface area, but doing so is unnecessary. Design goals are achieved by working with "$k_L a$" as a product. Gas transfer is generally improved by increasing the volumetric gas fraction in the liquid (called "gas holdup") and by increasing the interfacial area (smaller bubbles for the same amount of gas increases surface area). The time (t) required to achieve a given infusion efficiency in the pressure vessel depends on $k_L a$. The relationship among infusion efficiency, residence time and $k_L a$ is:

$$\text{Infusion Efficiency} = 1 - e^{(-k_L a \cdot t)}$$

We have used system experiments to calculate $k_L a$ for the process in the saturation vessel as a whole, but the majority of the gas transfer occurs in the churning flow where there is an abundance of gas-liquid surface area.

Superficial Liquid Velocity—This is the bulk velocity of the water in the vessel once downward flow is established below the plunge zone.

The superficial liquid velocity is calculated simply by dividing the volumetric throughput of water in the saturation vessel by the vessel's cross-sectional area at a location of generally calm, downward flow. This provides the speed at which the downward flow is moving at that location, and is used in comparison to the rise velocity of gas bubbles of various sizes to understand their escape potential. Vessel geometry in the exit zone is then manipulated to limit escaping bubble size while not disturbing the vessel geometry optimized for gas transfer in the plunge zone.

The invention provides devices and processes that dissolve gas into a liquid, typically an aqueous liquid. Applications for this invention include the production of a pressurized feed stream for processes that introduce into water a subsequently depressurized feed stream in a manner that minimizes bubble formation for making that gas chemically or biologically available in still dissolved form, such as for aeration of bodies of water such as lakes and ponds.

In other applications the invention provides the same or similar pressurized feed stream for processes that subsequently depressurize the feed stream in a manner to maximize bubbles of predetermined sizes for use in dissolved air flotation wherein the buoyancy of the gas in bubble form is used to physically separate or treat a receiving body of contaminant-laden liquid. Other applications needing an efficient, pressurized gas-laden liquid stream provided by the invention exist or may be contemplated. An essential feature of each system is the production of gas-laden liquid to serve a particular end use. This is achieved by taking a slip stream of liquid from a source location, pretreating the liquid as needed and pressurizing the liquid in a closed vessel to increase the amount of gas that can be dissolved therein. In the present invention the liquid is injected as a jet and directed at the surface of the liquid held in the closed vessel which is pressurized with the gas to be solubilized in the liquid. In the embodiments described, the liquid is aqueous and the gas is either oxygen or air, but any combination of liquid and gas can be employed. The process is generally termed plunging jet saturation, and with this invention energy use is minimized and undissolved gas in the effluent is controlled in both bubble size and total volume.

FIG. 1 schematically illustrates an arrangement of processing equipment according to the invention for producing a gas-laden liquid with a minimum of bubbles to feed a downstream process for aeration of bodies of water, such as a pond P. In this embodiment, pond P is shown receiving the output of a transportable aeration station 110 to supply oxygenated water, preferably fully-saturated, with a minimum of loss in the form (shown within the dashed line box) of bubbles.

The arrangement of FIG. 1 shows an exemplary process and equipment arrangement. In this embodiment, the transportable aeration station 110 produces oxygenated water, preferably fully-saturated, with a minimum of loss in the form of bubbles. The transportable aeration station 110 is shown as including a trailer 112, which is capable of convenient transport to a desired location. The trailer 112 can be transported by suitable land, air or water craft, not shown.

The trailer 112 is shown as including a plunging-jet saturation unit (the trailer contents), which includes the necessary equipment to oxygenate water for discharge into pond P. The plunging-jet saturation unit will be better understood in terms of design and operation with reference to FIG. 3, below. The equipment includes oxygen supply tanks 116, 116' which feed oxygen supply line 118 for introduction into a pressure vessel 120. A water jet 122 receives process water via a supply line 124 which receives the output of process water pressurizing and metering module 126. The pressurizing and metering module 126 is, in turn, supplied filtered pond water via supply line 128 from water pumping and filtration unit 130, which discharges filtrate to sump 131. The filtration unit 130 in turn receives pond water via supply line 132 which is fed pond water via intake 134. The pond P is reoxygenated by introducing the oxygenated processed water from outlet 136 which conveys it to processed water pond distributor 138.

In this embodiment the plunging-jet saturation unit and its associated components are designed and controlled to provide processed water to pond distributor 138 with a minimum of bubbles in terms of number and size, and the goal is making the dissolved gas chemically or biologically available, e.g., as dissolved oxygen for feeding bacteria that break down contaminants.

As noted, the arrangement of FIG. 1 is exemplary and can be modified as a particular application is contemplated. For example, the filtration unit 130 can be located in the trailer 112, if desired.

Figure 2:
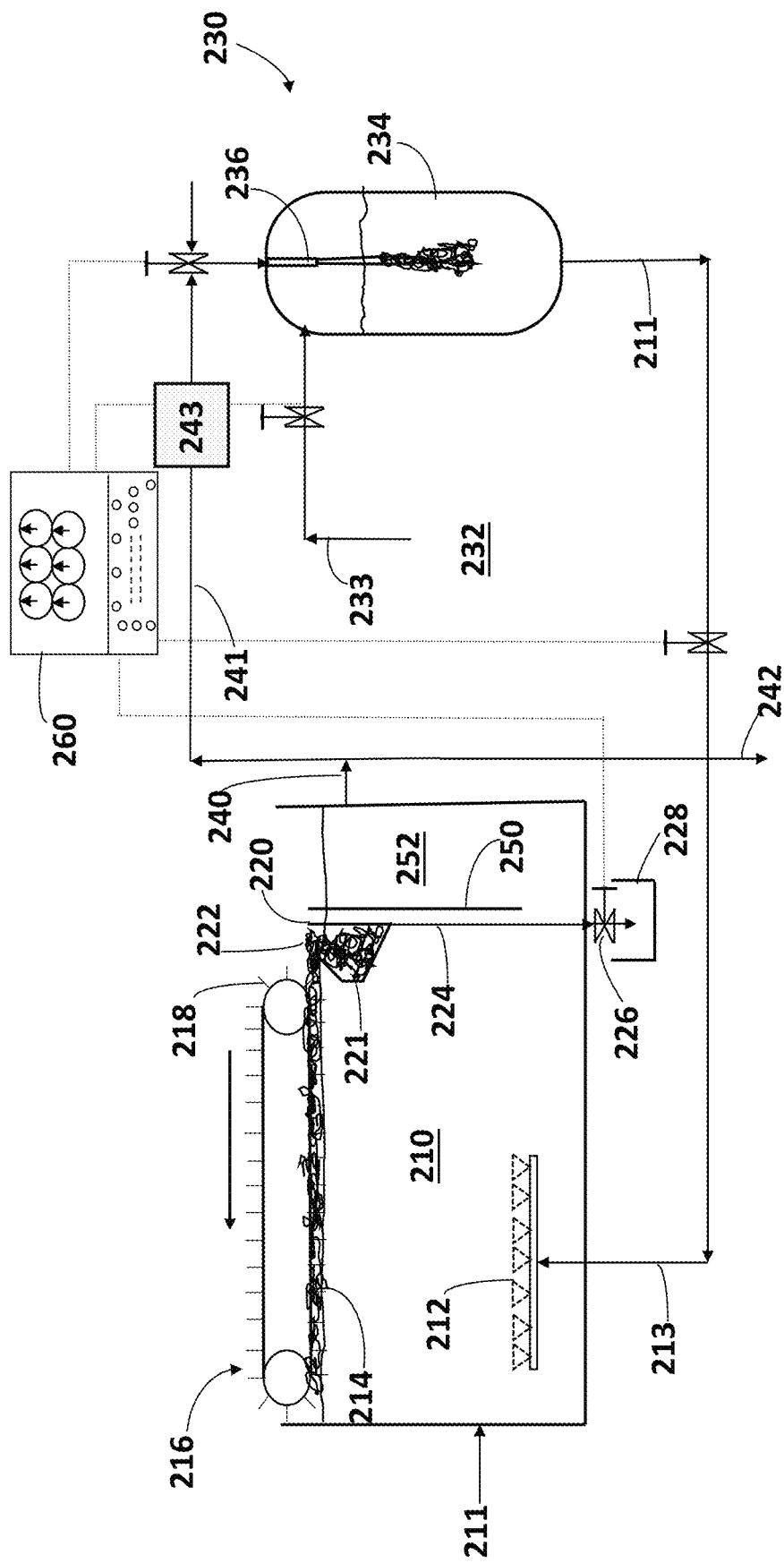
FIG. 2 schematically illustrates an arrangement of processing equipment according to the invention for dissolving a gas primarily to facilitate an enhanced treatment of waste water by dissolved air flotation.

FIG. 2 schematically illustrates an arrangement of processing equipment according to the invention for dissolving a gas primarily to facilitate an enhanced treatment of waste water by dissolved air flotation. Dissolved air flotation (DAF) is a water treatment process that clarifies wastewaters (or other waters) by the removal of suspended matter such as oil or solids by the use of bubble buoyancy and the hydrophobic property of suspended matter to be removed. The suggested size of bubbles in practice is a distribution in the range of 10-230 μm with a mean diameter of about 60 to 90 μm, but depends on the specific size and content of contaminants to be removed. The removal is achieved by utilizing air bubbles in a flotation tank, such as flotation tank 210. The bubbles are of a size that causes them to rise through the waste water from a distributor 212 near the bottom of tank 210 and adhere to suspended matter and cause the suspended matter to float to the surface of the water to form a floating layer 214 where it may then be removed by a skimming device 216. The skimming device 216 is here depicted as a belt which has projections 218 that gather the floating layer. Some DAF embodiments may include a wier 220, a collection area 222 and a collection sump 221, which can be drained by means of line 224 and valve 226 to sump 228.

The bubbles introduced into tank 210, which is supplied with feed process stream via line 211, by distributor 212 are made by depressurizing the gas-laden water prepared by plunging-jet saturation unit 230, which will be better understood in terms of design and operation with reference to FIG. 3, below. The distributor is engineered to produce the bubbles of appropriate size for the application using the dissolved gas feed stream. The equipment includes air supply tank 232 which feeds air supply line 233 for introduction into a pressure vessel 234. A water jet 236 receives process water via a supply line 240 from tank 210 on the downstream side of tank 210 following separation of the floating layer 214. Following removal of the floating layer 214, the water freed of sludge will pass under underflow wier 250 to a discharge area 252 from which the process water can be withdrawn via line 240 and split into line 241 for feeding the plunging-jet saturation unit 230 and line 242 for discharge. The water in line 241 is pumped and preferably subjected to filtering by means not shown in unit 243.

According to the invention, the plunging-jet saturation unit 230 designed for a DAF end use may allow for a different constraint on escaping bubble size, as the goal in DAF is to utilize the physical characteristics of the bubbles themselves. In this embodiment of a DAF, the system of the invention provides gas-laden water via line 211 to the bottom of a flotation tank 210 through a distributor 212, which is fed from the plunging-jet saturator unit 230. Care is given to factors favoring a minimum size of escaping bubble from the plunging jet saturator, which may be larger or smaller than the constraints of other applications even as the primary product of the saturator is a gas-laden water for further conditioning by the distributor 212 to affect a final bubble cloud size range. In a mixed application, it would also be possible to split the effluent from the plunging jet saturator unit 230 into an oxygenating stream producing dissolved gas with minimal bubbles and a bubble-producing stream for flotation.

A controller 260 is provided to control the operation of the plunging-jet saturation unit to optimize bubble production as well as to assure operation of all of the DAF process to achieve the maximum solids reduction for the energy consumed. Various sensors, valves and actuators will be enabled by the controller, some of which are schematically illustrated with associated control lines, which can be hard-wired or wireless.

DAF is widely used in treating the industrial wastewater effluents from oil refineries, petrochemical and chemical plants, natural gas processing plants, paper mills, general water treatment and similar industrial facilities. A similar process, induced gas flotation (IGF), is also used for wastewater treatment, and froth flotation is commonly used in the processing of mineral ores. Some industries use gases other than air. For example, in the oil industry the preference is to avoid air as the flotation medium due to the explosion risk, and nitrogen gas is used instead.

The feed water to the DAF float tank may be dosed with a coagulant, such as ferric chloride or aluminum sulfate, where that aids coagulation of colloidal particles or facilitates conglomeration of particles into larger clusters.

Figure 3:
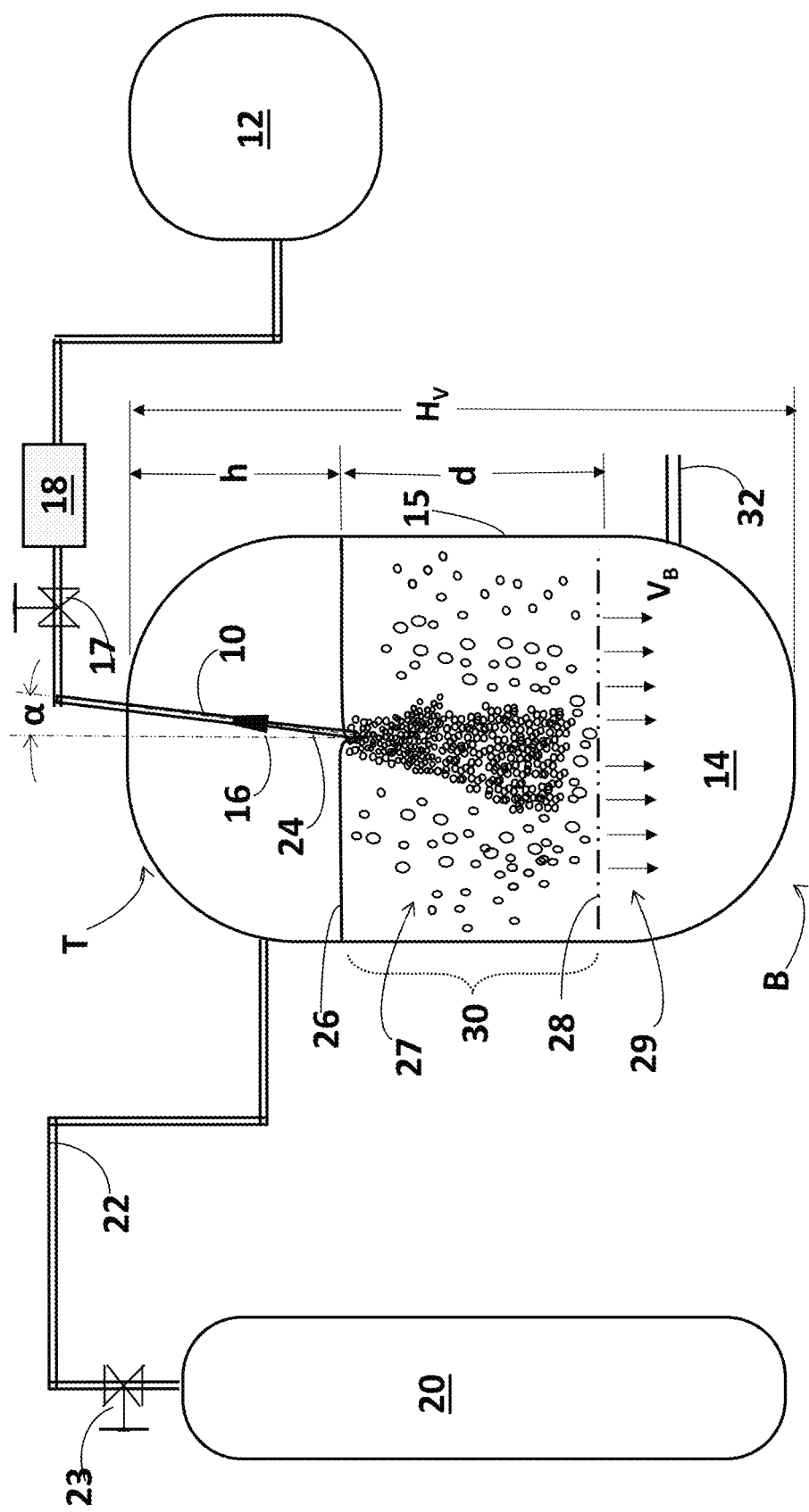
FIG. 3 schematically illustrates a plunging-jet saturator unit according to the invention.

FIG. 3 schematically illustrates a plunging-jet saturator unit according to the invention. A line 10 directs a flow of water or other fluid from a source 12 outside pressure vessel 14 to a nozzle 16. The liquid is pressurized by pump 18 and the liquid flow rate controlled by valve 17. The pressure vessel 14 has an upstanding sidewall 15, a sealed bottom wall B and a sealed top wall T. The vessel 14 has total vertical dimension Hv pressurized by the introduction of a gas, such as air or oxygen, by means of a gas source such as a pressurized tank 20, which supplies the gas to pressure vessel 14 via line 22 and valve 23. The introduction of the pressurized gas, pressurizes gas in the head space, which is the vessel 14 volume between the top T and the liquid surface 26, as indicated by dimension h. The upper surface, i.e., surface 26, of the liquid at commencement of operation is no more than 75%, e.g, less than 60%, of the vessel height from the vessel bottom wall B.

In operation, the pressurized liquid is discharged from nozzle 16, which forms the liquid into a jet 24 which is directed at an angle α at the surface 26 of the liquid in pressure vessel 14. The liquid jet 24 plunges into the water in the vessel 14 with such force that it penetrates deep into the liquid below the liquid surface 26 as to entrain the gas surrounding the plunging jet and create a turbulent impact and plunge zone. The resulting turbulence and mixing of gas and liquid, under pressure, causes the gas to be driven into the liquid in the vessel 14 and breaks up the gas and the liquid into a churning flow and creates in a large number of bubbles, shown generally as 27. The turbulence extends downwardly in the vessel 14 to a prominent boundary indicated by dashed line 28 to the turbulent impact and plunge zone 30 above the boundary, which is shown to have a depth d.

Below the boundary, e.g., line 28, the overall bulk flow, represented by the row of arrows (↓) below line 28 is a quiescent zone 29, which has less turbulence and the fluid flow is predominantly downward toward the discharge. In this zone, the bulk flow velocity, also known as the calculated superficial liquid velocity, of $V_B$ of liquid can be looked at as determining the rate at which the fluid passes through the vessel 14. Gas-laden liquid is withdrawn from the vessel 14 via line 32. In one arrangement, the combined length of h+d in vessel 14 is in embodiments 5 to 10, e.g., about 6 to 8, times the internal diameter. Desirably, for optimizing infusion efficiency while preventing liquid from interfering with the gas line 22 or safety features like a pressure relief valve (not shown), the liquid surface 26, will at commencing of operation be at no more than 70% of the h+d length, which can be reasonably designed as the process needs require, but will depend on system throughput.

It is desirable to produce small bubbles in the plunge zone 30 because this increases the interfacial surface area for gas transfer and dissolution. The more turbulence imparted to the plunge zone, the finer the mean bubble size will be due to increased shearing of larger bubbles into smaller ones. However, creating this greater turbulence costs energy because for a given mass flow rate through the vessel a higher jet velocity is needed, which necessitates a higher pressure drop across the nozzle 16 and a higher pressure in the supply line 10. As a result, it is a design condition of this invention to minimize pressure drop across the nozzle 16 while maintaining an infusion efficiency in the saturation vessel 14 greater than 90% over the desired operating range of the system. Minimizing energy use limits the fineness of the bubbles produced, which has a second benefit.

Fine bubbles that escape the plunge zone 30 and enter the outlet line 32 would be carried undissolved out of the vessel 14 and increase the total amount of gas required to reach the desired level of dissolved gas. Even in minimizing energy use for the plunging jet saturator, fine bubbles can be made in plunge zone 30 that proceed to the quiescent zone 29. In the quiescent zone 29, bubbles are subject to the superficial liquid velocity downward while their own buoyancy drives them upward. As a guide to operation, a typical calculated superficial liquid velocity $V_B$ of 4.2 cm/sec or more is needed to exceed the approximate terminal rise velocity of a 270 micron oxygen bubble in water at 20° C. and 300 psi according to Stokes' Law. In practice, one of two things will happen to bubbles too small to move counter to the bulk flow out of the vessel. First, if enough are hovering below the turbulent impact and plunge zone 30, they may coalesce, resulting in a larger bubble with more buoyancy that then moves upward into the turbulent impact and plunge zone 30. Second, hovering without coalescing would give such a bubble additional time to give up gas to the surrounding fluid provided it is not fully saturated, resulting in a slowly shrinking bubble that loses buoyancy and begins to be swept out of the saturation vessel with the bulk flow.

For some applications, escaping bubbles below a certain size may not be a concern or may be desired, such as in DAF as described above. In other applications, any undissolved gas is considered an inefficiency. This invention includes several strategies to minimize the volume and bubble size of escaping undissolved gas. First, the vessel is operated at greater than 90% Infusion Efficiency, but purposefully below full saturation to allow bubbles that escape the plunge zone to continue to give up gas to the not fully saturated surrounding liquid. In the second strategy, additional length can be provided for the quiescent zone to allow more time for the bubbles to coalesce or shrink. In a third strategy, illustrated with FIG. 4, the superficial liquid velocity is manipulated via altering the vessel geometry in the quiescent zone, so as to alter the balance between the superficial liquid velocity and the rise velocity of bubbles of a given size to trap smaller bubbles within the vessel. Finally, in a fourth strategy, a means of determining if significant undissolved gas is escaping the vessel 14 is provided, which allows real-time operating data to provide a control signal for adjustment to operating conditions to reduce the volume of escaping gas.

In operation, the pressurized liquid discharged from nozzle 16, which forms the liquid into a jet 24, is introduced at a pressure greater than that of the headspace, e.g., in some embodiments, a pressure of from about 100 to 400 psi, with 200 to 300 psi being nominal. The nozzle will be of such design to maintain a tight, narrow stream of fluid at a velocity in some embodiments of from about 10 to 25 meters per second, e.g., from 15 to 20 meters per second. The lower velocity is preferred to minimize pressure drop across the nozzle 16; however, the same nozzle is used across the continuous operating range of the system and must accommodate the minimum and maximum flows (i.e., turndown) of the demanded dissolved gas feed to the downstream process. The angle α of the jet can be adjusted to between 0 and 40°, with angles under 10° preferred for most applications. Nozzles having orifices of in some embodiments from 0.375 to 0.75 inches have been shown effective with the dimensions and operating parameters identified herein, but will be larger or smaller as the system is scaled to the desired dissolved gas nominal throughput demanded for an engineered downstream application.

The invention solves the problems that seemingly precluded the plunging jet gas-liquid contactor from being implemented as a pressurized, single-pass saturator to produce a gas-laden liquid product, taking advantage of the plunging-jet for reduced energy use versus spray-type systems while maximizing the dissolved content of gas in the processed liquid and also simultaneously limiting undissolved gas content exiting the device in either size of escaping bubbles or total undissolved gas volume. By using the plunging jet, the combination of gas entrainment, high turbulence in the turbulent impact and plunge zone 30 and high pressure have a compounding effect. The invention has provided advantages in both the efficiency of gas transfer and in the range of turndown at which high efficiency can be maintained.

Bubbles 27 can and do escape the plunge zone and exist in the calmer water below. Bubbles 27 with a rise velocity that can overcome the superficial liquid velocity in the quiescent zone return to the plunge zone. Bubbles that do not rise fast enough are slowly carried away with the exiting flow and eventually escape the vessel. Smaller bubbles are swept out faster than larger bubbles, leading to a range of residence time for bubbles in the bulk flow that may be used for additional gas transfer to the liquid. It is an advantage of the invention that the physical and operating parameters may be selectively chosen to achieve substantially bubble-free effluent within desired constraints to accommodate different processing needs, even though the form of gas transfer produces copious amount of bubbles within the vessel.

Figure 4:
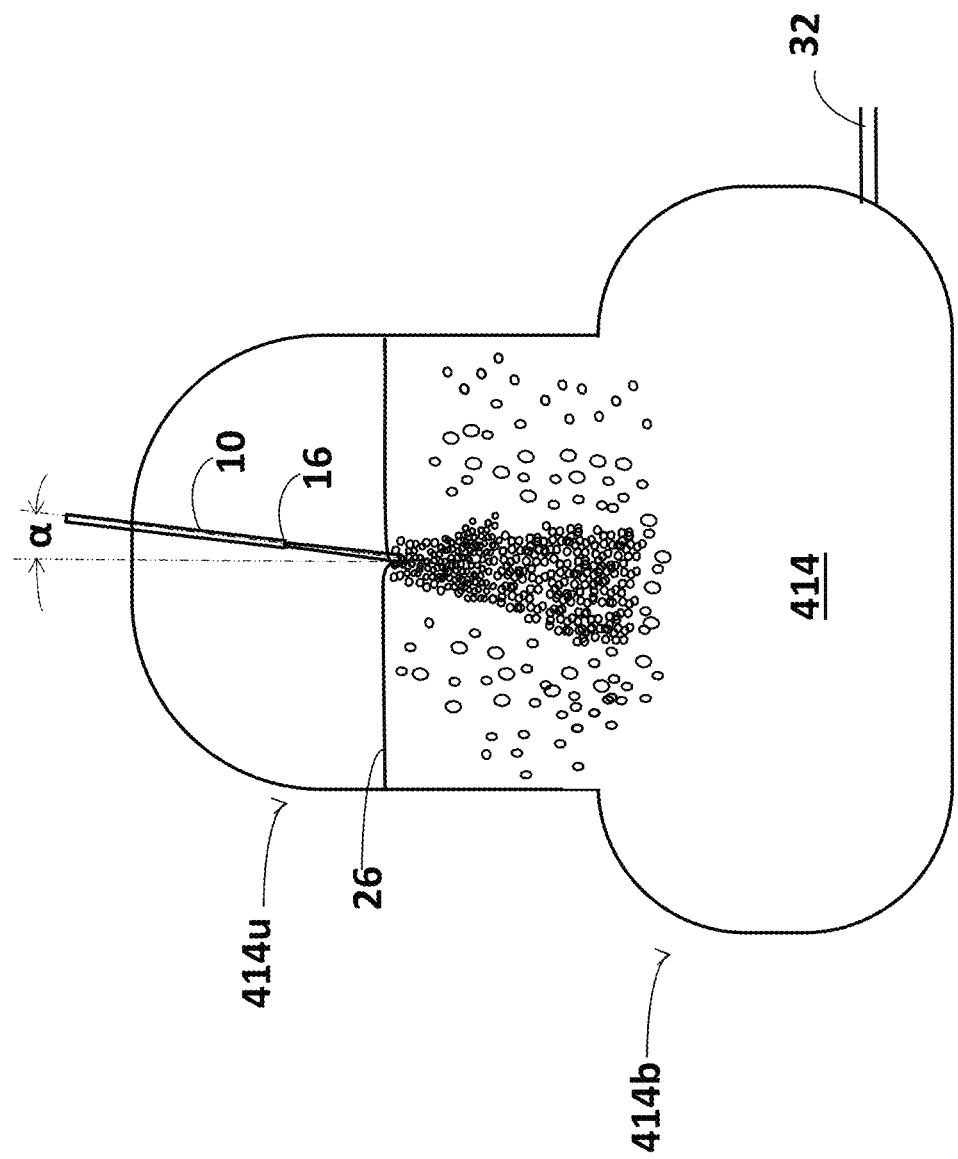
FIG. 4 schematically illustrates an alternate exemplary design of plunging-jet saturator unit according to the invention.

FIG. 4 schematically illustrates an alternate exemplary design of plunging-jet saturator unit according to the invention. In this embodiment, a vessel 414 is shown and may be substituted for the vessel 14 shown in FIG. 3. The lower portion 414b of the chamber is wider than the upper portion 414u, with a diameter increase in some embodiments from 50 to 300% between the upper and lower portions. Employing a bottom section diameter larger than the top section reduces the superficial liquid velocity in this section to prevent the escape of bubbles larger than a given size. This is calculated and designed by comparing bubble size rise velocity according to Stokes' Law with the lower superficial liquid velocity that comes with a wider vessel diameter in the quiescent zone. Variations can be more or less extreme as needed to limit adverse effects of consequences of bubbles escaping. Internal structures may be utilized to condition the flow toward uniformity across the cross-section. This embodiment is just one of several possible alternative vessel geometries or features that provide a bubble limiting functionality. Another design would employ a conical, or even spherical, bottom section. Designs of this nature could reduce the water weight of the vessel compared to the embodiment of FIG. 4.

Figure 5:
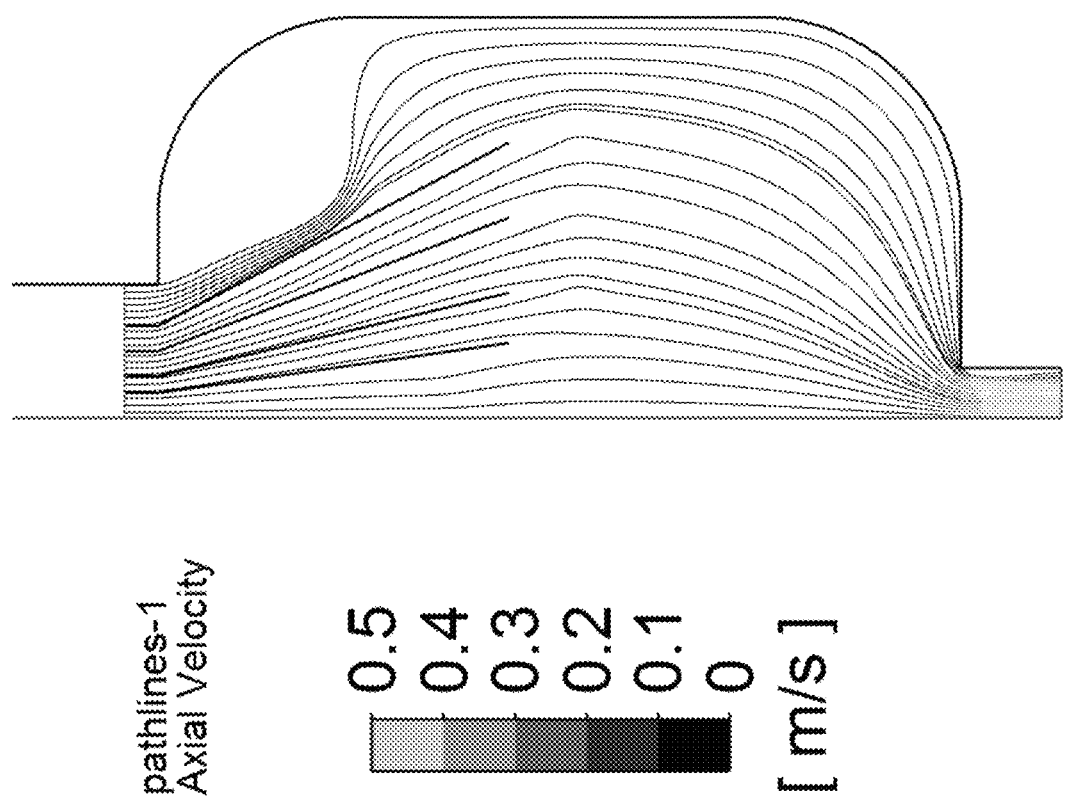
FIG. 5 shows computational fluid dynamics modeling results for the lower portion of one realization of the saturator design type described herein. These results are relevant to and further described in Example 4.

FIG. 5 shows computational fluid dynamics modeling results for the lower portion of one realization of the saturator design type described above. These results are relevant to and further described in Example 4.

Figure 6:
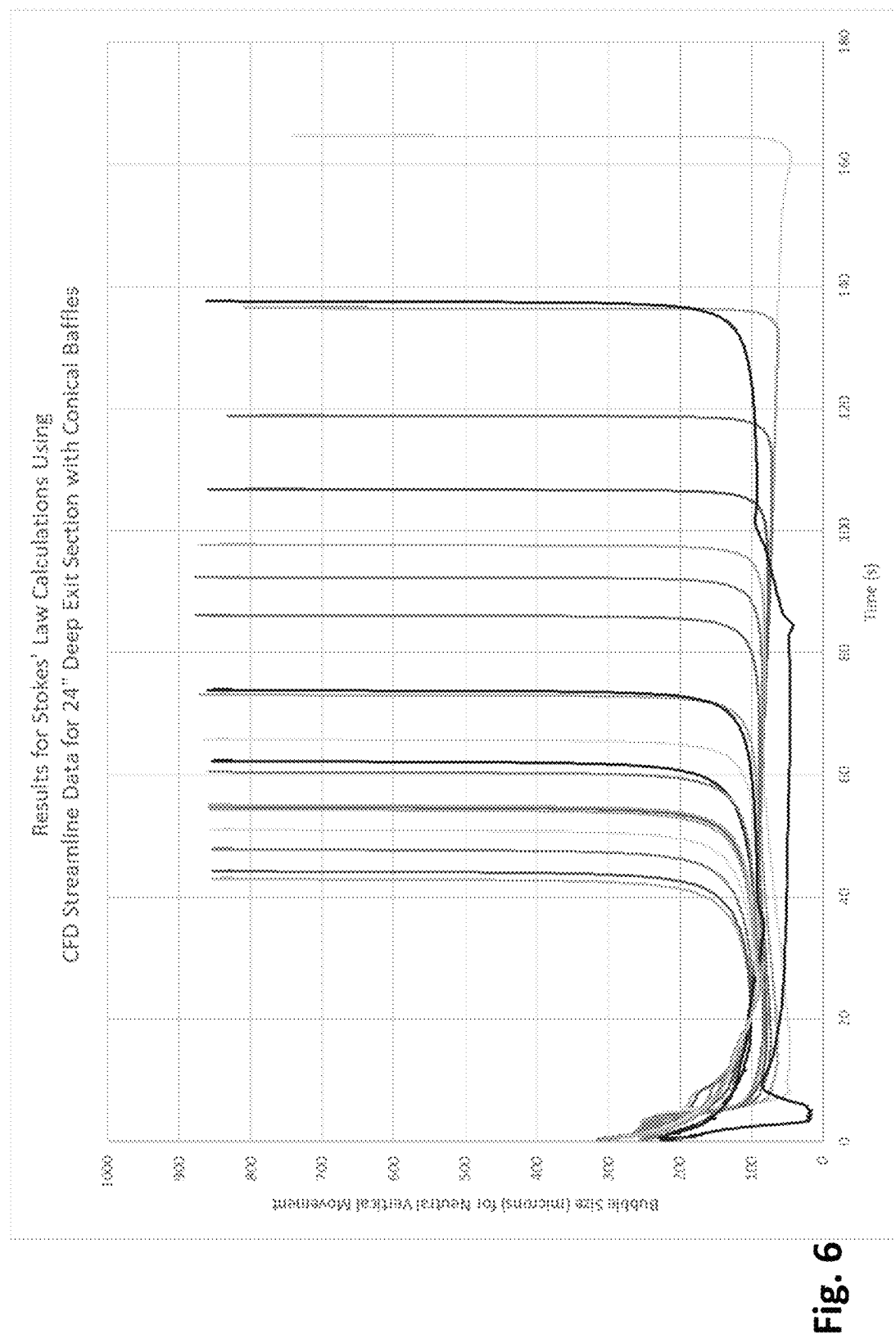
FIG. 6 shows calculated data derived from Stokes' Law and the results from the computational fluid dynamics modeling illustrated in FIG. 5. These results are also relevant to and further described in Example 4.

FIG. 6 shows calculated data derived from Stokes' Law and the results from the computational fluid dynamics modeling illustrated in FIG. 5. These results are also relevant to and further described in Example 4.

EXAMPLES

The inventors performed experiments to ascertain the combination of design features that demonstrate the advantages of the present invention. A trailered plunging jet saturation unit as depicted in FIG. 1 was designed and evaluated according to the performance features described in the Definitions. Referring to the saturator described more specifically in FIG. 3, parameters directly varied during experimentation included the geometric profile and diameter of nozzle 16, the tank liquid surface level 26, the liquid flow from supply line 10, gas flow from supply line 22, and the operating pressure of vessel 14. Parameters indirectly varied include the superficial liquid velocity $V_B$, the length of the quiescent zone below line 28, and operational dimensions h and d via altering the tank liquid volume and liquid throughput.

Example 1

In a first example of results, a ⅜" converging water nozzle was mounted in a pressure vessel of approximately 50 inches in total height. The vessel was operated using water as the liquid and oxygen as the dissolving gas. Table 1 shows recorded data and Table 2 shows corresponding calculated performance data including Infusion Efficiency and Specific Power Use. The intermediate calculation of the $k_H$ factor is known in the art of applying Henry's Law to a given set of conditions.

TABLE 1

| Primary Recorded Data for Example 1 | | | | | |
|---|---|---|---|---|---|
| Liq. Flow Meter gpm | O2 Flow Meter lb/hr | Inlet T °C. | Tank Digital Pressure psi | % Level Tank | Pump Outlet psi Gauge |
| 21.07 | 10.93 | 10 | 298 | 50 | 322 |
| 19.03 | 9.9 | 10 | 302 | 50 | 320 |
| 16.67 | 8.71 | 10 | 305 | 50 | 320 |
| 13.35 | 7 | 10 | 305 | 50 | 315 |
| 11.12 | 5.56 | 10 | 302 | 50 | 307 |

TABLE 2

| Calculated Data for Example 1 | | | | | | |
|---|---|---|---|---|---|---|
| O2 Calculated mg per L of Water | kH for Henry's Law at Avg T gram/L-psi | Henry's Law mg/L kH at Avg T | Infusion Efficiency (kH at Temp) | Nozzle DP psi | Water HP HP | Specific Power Use HP per lb/hr O2 |
| 1036.11 | 0.003701447 | 1134.27925 | 91.34481 | 24 | 3.956 | 0.36194 |
| 1039.07 | 0.003701447 | 1148.78893 | 90.44913 | 18 | 3.551 | 0.35867 |
| 1043.59 | 0.003701447 | 1159.67118 | 89.99035 | 15 | 3.110 | 0.35711 |
| 1047.29 | 0.003701447 | 1159.67118 | 90.30882 | 10 | 2.452 | 0.35029 |
| 998.66 | 0.003701447 | 1148.78893 | 86.93167 | 5 | 1.991 | 0.35802 |

Example 2

An example of the non-obvious optimization of the plunging jet saturator for minimum specific power use while simultaneously maximizing dissolved gas delivery, the same system was tested with four water nozzles of various diameters at nominally 250 psi tank operating pressure. Results, shown in Table 3, demonstrate that the ⅜" nozzle and the ½" nozzle have nearly identical specific power use for the tested conditions. The ¾" nozzle, while having a low pressure drop, produced a lower infusion efficiency percentage and the lowest volumetric mass transfer coefficient, $k_La$. The smallest nozzle, while producing the highest infusion efficiency, produced an unacceptable specific power use because of the pressure drop across the nozzle. In these results, the volumetric mass transfer coefficient, $k_La$, is calculated by knowing the working tank water volume and throughput to calculate a residence time in the vessel and then employing the infusion efficiency calculation demonstrated above to back-calculate an overall $k_La$ for the system.

TABLE 3

Comparison of Performance Parameters in Example 2

| | Water (gpm) | O2 (lb/hr) | Nozzle DP (psi) | Infusion Efficiency (%) | kLa (1/sec) | Specific Power Use (hp per lb/hr) |
|---|---|---|---|---|---|---|
| 3/4" Nozzle | 20.13 | 7.94 | 5 | 83.04 | 0.100204 | 0.376964 |
| 1/2" Nozzle | 19.78 | 8.15 | 8 | 87.10 | 0.113673 | 0.366526 |
| 3/8" Nozzle | 19.87 | 8.69 | 23 | 90.29 | 0.130034 | 0.366646 |
| 5/16" Nozzle | 20.82 | 9.13 | 52 | 91.57 | 0.125274 | 0.400232 |

It will be noted from Table 3 that the smallest nozzle required 9% more HP to deliver the same oxygen flow rate as the optimal ⅜" condition. The largest nozzle had an 8% lower infusion efficiency [0.8304/0.9029] and required 3% more HP per unit of oxygen mass as compared to the ⅜" condition.

Additional experiments were performed to visualize the behavior of the plunging jet saturator using a transparent vessel. The purpose of these experiments was to observe the plunge zone depth at various flow rates using various vessel diameters. The experiments also allowed for observation of escaping bubble volume and size under various conditions, aided by laser visualization methods. These experiments provided insight into the required quiescent zone length and optionally alternative quiescent zone geometries to limit gas escaping the saturator.

Example 3

The indication of an undesirable shift from dissolved gas content to undissolved gas content in the saturator effluent with changing operational conditions is illustrated in the data in Table 4. For this example, a reduction in the quiescent zone length was achieved by dropping the water level (%) in the vessel until bubbles began to encroach on outlet line 32. This demonstrated the importance of establishing a clear quiescent zone length below the turbulent plunge zone. In the data shown, water and oxygen flow are remarkably steady between 47% to 50% tank level. Beyond this point, at lower tank levels and therefore reduced length of quiescent zone, the water flow begins to drop as undissolved oxygen gas displaces the water rather than becomes dissolved in the water. The crossover of the water flow decreasing and the gas flow increasing for a given tank pressure operating condition is a clear indication of an unwanted increase in undissolved gas content in the effluent of the system. Since both water flow and gas flow are monitored in real time by the system, the decrease in water flow with an increase in gas flow is a valuable signal for the optimization of system performance, as undissolved gas content in the effluent represents inefficiency in the desired output and consumable (gas) use by the system.

TABLE 4

Data Showing Crossover Toward Gas Displacement vs. Gas Dissolved in Example

| Tank Level | Water (gpm) | O2 (lb/hr) |
|---|---|---|
| 50 | 21.51 | 11.62 |
| 49 | 21.5 | 11.65 |
| 48 | 21.51 | 11.61 |
| 47 | 21.53 | 11.64 |
| 46 | 21.45 | 11.65 |
| 45 | 21.32 | 12.05 |
| 44 | 21.2 | 12.16 |

A longer quiescent zone length, in addition to physically separating the bubble-rich plunge zone from the saturator outlet, benefits the process by providing residence time for bubbles escaping the plunge zone to coalesce and rise back into the plunge zone. If a bubble does not coalesce with others, by operating the saturator at slightly below full infusion efficiency, the escaping bubble has additional residence time in a longer quiescent zone to shrink as some portion of its gas transfers to the surrounding water. The proportion that transfers depends on the surface area of the bubble and how close to full saturation the surrounding water is.

In practice, lengthening the quiescent zone has practical limits due to economics and physical constraints like size and weight. In addition to or instead of quiescent zone length, the geometry of the quiescent zone can be designed to further limit undissolved gas bubbles of a target size or larger from escaping the saturator. In FIG. 4, we offered one such geometry design, but others may be contemplated that produce similar effects and are considered part of the invention.

FIG. 4 shows a saturator vessel consisting of two lengths of cylinders with different diameters in vertical orientation. The top diameter is chosen artfully to optimize the gas transfer efficiency of the plunge zone, while the bottom diameter is chosen to limit the maximum bubble size that can escape the saturator according to Stokes' Law.

A vessel of this type was designed, modeled and built and is the subject of Examples 4 and 5. The two-diameter saturator consisted of an eight-inch diameter top section and a 24-inch diameter bottom section. The top section length was designed to fully contain the plunge zone at the design operating conditions. At the entrance to the bottom section, a set of internal conical baffles were designed to condition the flow exiting the eight-inch diameter section, distributing the flow more uniformly into the 24-inch diameter bottom section. By conditioning the flow toward uniformity, the maximum superficial liquid velocity is minimized in the bottom section.

Example 4

The lower portion of the saturator described above was modeled using computational fluid dynamics for the purposes of designing the conical baffles and for evaluating the superficial liquid velocities achieved. The model was twodimensional and axisymmetric for reduced computational time. The modeled portion began at the exit of the upper, smaller diameter section, included the entire lower section and ended at the exit of the lower section. From the results, a set of streamlines indicating the path of massless particles released at the model inlet were generated and analyzed. FIG. 5 shows these streamlines, illustrating the paths of flow through the lower section of the saturator.

From the axial velocity data along the streamlines, the corresponding size of bubble whose buoyancy would just be balanced by the downward flow was calculated using Stokes' Law for the design operating conditions. A slower superficial liquid velocity results in a smaller bubble that "hovers" in the flow. Bubbles smaller than this bubble proceed slowly to the saturator exit, while bubbles larger than this bubble have the buoyancy to rise back toward the plunge zone in the upper portion of the saturator.

TABLE 5

Primary Recorded Data for Example 5

| Liq. Flow Meter gpm | O2 Flow Meter lb/hr | Inlet T ° C. | Tank Digital Pressure psi | % Level Tank | Pump Outlet psi Gauge |
|---|---|---|---|---|---|
| 20.34 | 9.38 | 17.22 | 302 | 75 | 325 |
| 20.27 | 9.52 | 17.22 | 301 | 70 | 324 |
| 19.73 | 9.41 | 17.22 | 303 | 65 | 326 |
| 19.67 | 9.21 | 17.22 | 302 | 60 | 325 |
| 19.65 | 9.16 | 17.22 | 301 | 55 | 324 |
| 19.58 | 9.21 | 17.22 | 301 | 60 | 324 |
| 19.84 | 9.33 | 17.22 | 301 | 65 | 324 |
| 19.84 | 9.37 | 17.22 | 301 | 65 | 324 |
| 19.92 | 9.36 | 17.22 | 303 | 70 | 326 |

TABLE 6

Calculated Data for Example 5

| O2 Calculated mg per L of Water | kH Henry's Law at Avg T gram/L-psi | Henry's Law mg/L kH at AvgT | Infusion Efficiency (%) (kH at Temp) | Nozzle DP psi | Water HP HP | Specific Power Use HP-hr/lb O2 |
|---|---|---|---|---|---|---|
| 921 | 3.22E−03 | 9.98E+02 | 92 | 23 | 3.85 | 0.41 |
| 938 | 3.22E−03 | 9.95E+02 | 94 | 23 | 3.83 | 0.40 |
| 953 | 3.22E−03 | 1.00E+03 | 95 | 23 | 3.75 | 0.40 |
| 935 | 3.22E−03 | 9.98E+02 | 94 | 23 | 3.73 | 0.40 |
| 931 | 3.22E−03 | 9.95E+02 | 94 | 23 | 3.71 | 0.41 |
| 939 | 3.22E−03 | 9.95E+02 | 94 | 23 | 3.70 | 0.40 |
| 939 | 3.22E−03 | 9.95E+02 | 94 | 23 | 3.75 | 0.40 |
| 943 | 3.22E−03 | 9.95E+02 | 95 | 23 | 3.75 | 0.40 |
| 939 | 3.22E−03 | 1.00E+03 | 94 | 23 | 3.79 | 0.40 |

FIG. 6 shows the bubble size that achieves neutral movement at any point along each streamline, where the buoyancy of the bubble is balanced by the superficial liquid velocity of the flow at that point. Bubbles of that size or greater are trapped within the saturator and prevented from escaping the saturator as undissolved gas. As shown, for this saturator design, there is a consistent trapping effect for bubbles around 100 microns in diameter within the first thirty seconds of residence time in the lower portion of the saturator. The maximum bubble size to capture is a design choice, and a wider lower portion, other geometries, or other internal flow conditioning devices could further reduce the superficial liquid velocity to capture smaller bubbles if desired.

Example 5

In this example, the operating data for the trailered saturator system in FIG. 1 retrofitted with the two-diameter saturator described in Example 4 is presented. The vessel was operated using water as the liquid and oxygen as the dissolving gas. Table 5 shows recorded data and Table 6 shows corresponding calculated performance data including Infusion Efficiency and Specific Power Use. The intermediate calculation of the $k_H$ factor is known in the art of applying Henry's Law to a given set of conditions. Infusion efficiency is improved as compared to results in Example 1 using the single diameter chamber. The higher specific power use is due to the higher inlet water temperature compared to Example 1, as the saturated amount of dissolved gas that a liquid can hold is inversely related to temperature.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. An apparatus for dissolving gas into a liquid in a single-pass, continuously flowing process, which comprises:
   a. a pressure vessel having upstanding side walls and a sealed top wall and a sealed bottom wall;
   b. the pressure vessel configured to receive liquid therewithin, the liquid having an upper surface spaced from the top wall;
   c. a gas source for supplying pressurized gas to the pressure vessel to fill a head space region above the upper surface of the liquid;
   d. a source of liquid and pump means to raise the pressure of the liquid to greater than that in the pressure vessel;
   e. one or more jet-forming nozzles connecting the liquid source to the pressure vessel and terminating at a point above the upper surface of the liquid;
   f. a valve between the pump and the pressure vessel to control the flow of fluid to the nozzle or nozzles and permit fluid to discharge through each nozzle to form a liquid jet which plunges into the liquid in the vessel and penetrates into the liquid below the liquid surface to entrain the gas surrounding the liquid jet and create a turbulent impact and plunge zone; and g. an outlet in or proximate to the bottom wall for withdrawing liquid from the pressure vessel, wherein the total cross-sectional area of the pressure vessel is increased below the turbulent impact and plunge zone such that the superficial liquid velocity prior to the outlet is reduced relative to the superficial liquid velocity in the turbulent impact and plunge zone, to provide a greater time for gas exchange from formed bubbles to the liquid and reduce the maximum diameter of bubbles that can escape.

2. An apparatus according to claim 1, wherein the gas source introduces gas at a pressure of from about 100 to 400 psi.

3. An apparatus according to claim 1, wherein each nozzle provides a stream of liquid at a velocity of from about 10 to 25 meters per second.

4. An apparatus according to claim 1, wherein each nozzle is offset from a vertical by an angle of from 0 to 40°.

5. An apparatus according to claim 1, wherein the maximum pressure drop across the jet nozzle is within the range of from about 10 to about 30 psi.

6. An apparatus according to claim 1, wherein the vessel contains one or more flow conditioning devices to reduce the superficial liquid velocity or increase fluid residence time below the turbulent impact and plunge zone and prior to the outlet to provide a greater time for gas exchange from formed bubbles to the liquid and reduce the maximum diameter of bubbles that can escape.

7. An apparatus according to claim 1, in which the pressure vessel comprises an upper portion and a lower portion, wherein the diameter of the lower portion is wider than that of the upper portion, such that the lower portion has a cross-sectional area which is from 50% to 300% greater than the upper portion.

8. An apparatus according to claim 7, wherein the height of the upper surface of the liquid at commencement of operation is no more than 75% of the height of the upper portion of the vessel containing the turbulent impact and plunge zone, as measured from the bottom of the upper portion of the vessel.

9. An apparatus according to claim 1, wherein the turbulent impact and plunge zone has a vertical depth which is greater than a horizontal dimension or diameter within the turbulent impact and plunge zone.

10. An apparatus according to claim 1, wherein the pressure vessel is dimensioned to facilitate the minimization of escaping gas bubble size and number and achieve from 90 to 100% of theoretical saturation concentration according to Henry's Law.

11. An apparatus according to claim 7, wherein the upper portion of the vessel containing the turbulent impact and plunge zone has a height which is about 5 to 10 times its internal diameter.

12. A process for dissolving gas into a liquid in a single-pass, continuously flowing process, wherein the process comprises:

a. providing a pressure vessel having upstanding side walls and a sealed top wall and a sealed bottom wall;

b. providing liquid within the vessel, the liquid having an upper surface spaced from the top wall;

c. providing a gas source for a flow of pressurized gas to the pressure vessel to fill a head space region above the upper surface of the liquid;

d. providing a source of liquid and pump means to raise the pressure of the liquid to greater than that in the pressure vessel;

e. providing one or more nozzles connecting the liquid source to the pressure vessel and terminating at a point above the upper surface of the liquid;

f. providing a valve between the pump and the pressure vessel to control the flow of fluid to the nozzle or nozzles and permit fluid to discharge through each nozzle to form a liquid jet which plunges into the liquid in the vessel and penetrates into the liquid below the liquid surface to entrain the gas surrounding the jet and create a turbulent impact and plunge zone;

g. providing an outlet in or proximate to the bottom wall for withdrawing liquid from the pressure vessel, wherein the total cross-sectional area of the pressure vessel is increased below the turbulent impact and plunge zone such that the superficial liquid velocity prior to the outlet is reduced relative to the superficial liquid velocity in the turbulent impact and plunge zone, to provide a greater time for gas exchange from formed bubbles to the liquid and reduce the maximum diameter of bubbles that can escape, and further wherein the gas is continuously dissolved in the liquid in one pass through the vessel for downstream process use and produces a liquid within 90% fully saturated with the dissolving gas at pressure per Henry's Law but less than 100% fully saturated.

13. A process according to claim 12, wherein the gas is introduced at a pressure of from about 100 to 400 psi.

14. A process according to claim 12, wherein the nozzle provides a stream of liquid at a velocity of from about 10 to 25 meters per second.

15. A process according to claim 12, wherein the nozzle is offset from a vertical by an angle of from 0 to 40°.

16. A process according to claim 12, wherein the pressure drop across the nozzle is within the range of from about 10 to about 30 psi when the process is operated at 100%.

17. A process according to claim 12, wherein the plunge zone has a height which is 5 to 10 times its internal diameter.

18. A process according to claim 12, wherein the turbulent impact and plunge zone has a vertical depth which is greater than its horizontal dimension.

19. A process according to claim 12, wherein the vessel is dimensioned and controllable to facilitate the minimization of escaping gas bubble size and number and achieve from 90 to 100% of theoretical saturation concentration according to Henry's Law.

20. The process of claim 12, wherein the size and number of bubbles that escape is limited by one or more steps selected from the group consisting of:

a. increasing the length of separation between the outlet and the turbulent impact and plunge zone to allow residence time for bubbles leaving the plunge zone to coalesce and return to the plunge zone or to not coalesce but shrink due to additional gas transfer to the surrounding not fully saturated liquid, b. lowering the superficial liquid velocity by increasing the diameter or horizontal dimension of the vessel in the length of separation between the outlet and the turbulent impact and plunge zone to lower the maximum diameter of bubbles capable of escaping, and/or c. limiting the velocity of the liquid jet which plunges into the liquid in the vessel to the velocity required to achieve greater than 90% infusion efficiency over the desired operating range to minimize specific power use and thereby limit the fineness of the bubbles generated in the plunge zone.

21. The process of claim 12, wherein the process has a specific power use and the specific power use of the process is lowered by:
  a. injecting an impinging jet of liquid through one or more nozzles vertically downward through the head space into a saturation zone below the surface of the liquid at a velocity sufficient to create and maintain a saturation zone of bubbles to achieve greater than 90% infusion efficiency versus Henry's Law saturation level but minimize pressure drop across the one or more nozzles to minimize specific power use for gas transfer and mitigate the production of fine bubbles capable of escaping the vessel; and
  b. providing an outlet for withdrawing the liquid product located at a distance from the saturation zone within a vessel section dimensioned and with internal geometry or flow conditioning devices to reduce the superficial liquid velocity and preclude bubbles of a target size from being withdrawn by the outlet.

22. The process of claim 12, which further comprises:
  a. determining gas demand for a given operation, either for steady state operation or determined dynamically from a downstream process signal;
  b. determining an operating pressure and a minimum liquid demand for the gas demand at a predetermined infusion efficiency that minimizes specific power use;
  c. monitoring the flow of pressurized gas and liquid to maintain an average condition that gas flow and liquid flow either both increase or both decrease with changes to requested gas demand; and
  d. under a non-transient condition where gas flow increases concurrently with a decrease in liquid flow, of sufficient duration to indicate a likely excursion of undissolved gas escaping the outlet, reduce the liquid pressure upstream of the pressure vessel to decrease liquid jet velocity or take action to restore steady state operating conditions where gas flow and liquid flow either increase together or decrease together or remain in the same proportion.

23. A process according to claim 12, in which the pressure vessel comprises an upper portion and a lower portion, wherein the diameter of the lower portion is wider than that of the upper portion, such that the lower portion has a cross-sectional area which is from 50% to 300% greater than the upper portion.

\* \* \* \* \*